J. A. WHEELER.
METHOD OF FORMING FIREPROOF SLABS OR BOARDS.
APPLICATION FILED DEC. 20, 1911.
1,048,616.
Patented Dec. 31, 1912.
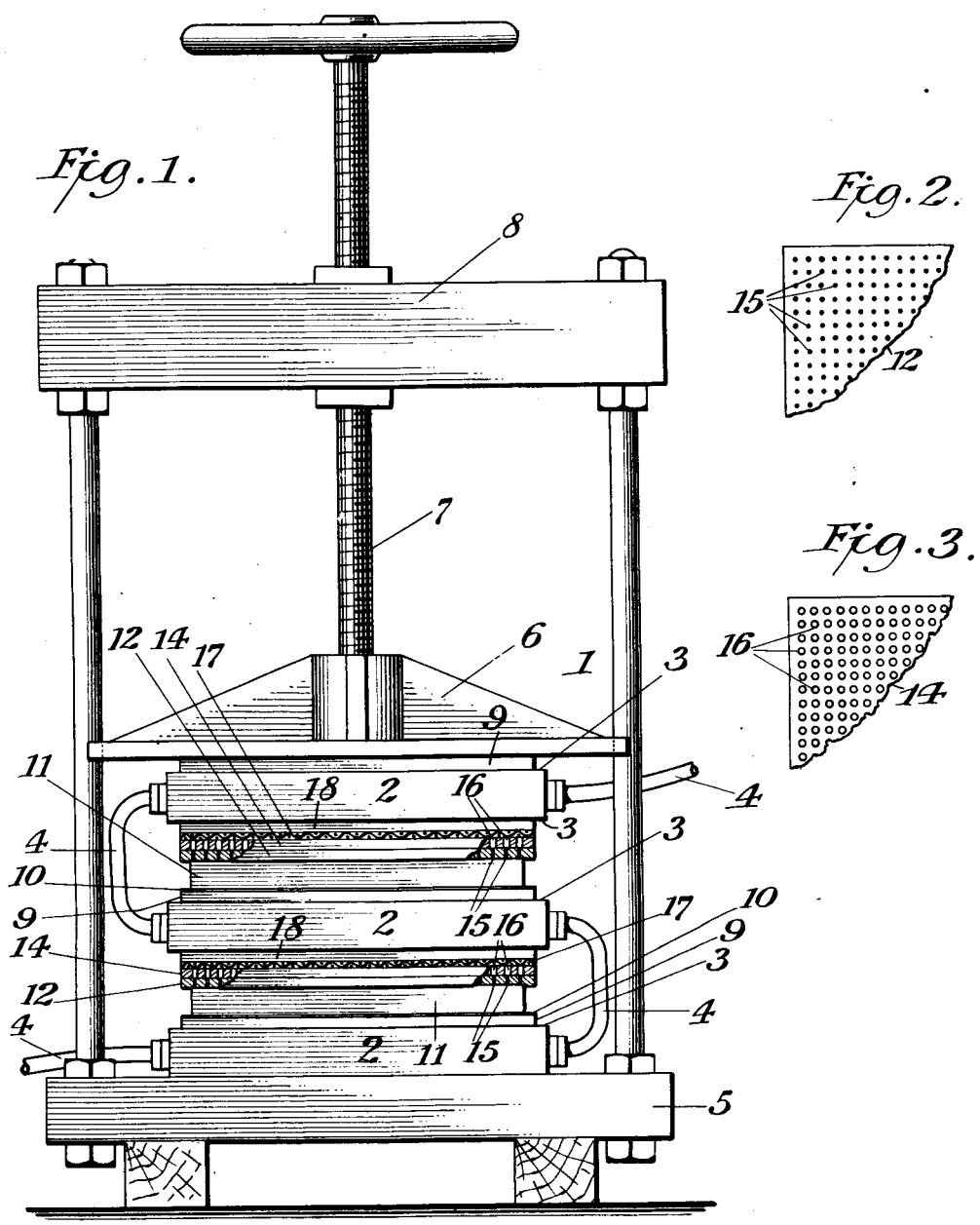

UNITED STATES PATENT OFFICE.

JAMES A. WHEELER, OF SOMERSET COUNTY, NEW JERSEY.

METHOD OF FORMING FIREPROOF SLABS OR BOARDS.

1,048,616.  Specification of Letters Patent.  Patented Dec. 31, 1912.

Application filed December 20, 1911. Serial No. 666,880.

*To all whom it may concern:*

Be it known that I, JAMES A. WHEELER, a citizen of the United States, and resident of the county of Somerset and State of New Jersey, have invented certain new and useful Improvements in Methods of Forming Fireproof Slabs or Boards, of which the following is a specification.

This invention relates to methods of forming artificial lumber, such as slabs, boards or the like, and it has particular relation to the forming or production of materials or articles of this class which have a fireproof quality and which are formed of artificially united substances solidified and compressed so that sufficient density and strength will be imparted to effectually resist the strains and other conditions which are encountered in the employment of the material in building constructions.

The object of my present invention is to provide an improved method whereby such artificial lumber may be more effectually, conveniently and economically formed or produced in the desired condition and shape for employment as a building material or in building construction, such as in the form of slabs or boards or the like, and whereby a maximum degree of density and strength will be imparted to the finished material.

My present invention involves improvements and advantages over the method set forth and described in my previous Patent No. 984,870, dated February 21, 1911, to which reference may be had for a general understanding of the main features of the general method to which my present improvements particularly relate.

In the accompanying drawings—Figure 1 is a side view of a press such as may be employed in carrying out the improved method herein described, showing the slabs or articles in tier arrangement therein and subject to the method of forming or compressing the same. Fig. 2 is a face view of one of the perforated plates employed in the improved method. Fig. 3 is a face view of another of the perforated plates as employed in the method.

Corresponding parts in all the figures are denoted by the same reference characters.

The artificial lumber or building material to be formed or produced by my improved method, as herein described, consists of a suitable filler combined with a relatively small proportion of a soluble fireproof binder and solidified to impart the required strength and resistance to strain. The filler preferably includes burnt clay broken into small particles or crushed into a pulverized condition, or it may be sawdust or any other suitable or adapted substance. If burnt clay is employed, lumps of artificial clay may be burned in a suitable kiln and then broken or crushed to the desired condition, or burnt bricks or parts thereof may be broken or crushed. Said broken or crushed element of the filler is then preferably mixed or compounded with asbestos in suitable or desired proportion, and there is then added to the compound or mixture a relatively small proportion of a suitable soluble fireproof binding material which will permanently unite the elements of the mass. Water in sufficient quantity may be added with the binding material, to render the mass sufficiently plastic to enable the thorough stirring and mixing of the elements with a proper consistency which will permit of the molding or forming of the moist compound into any desired shape according to the specific use for which it is intended. The binding material preferably consists of or includes silicate of soda. After the plastic mass is compounded as above set forth, it is molded into the desired general shape or form in a suitable mold, and is then hardened and dried by the improved method as hereinafter set forth, whereby it will be formed or produced in the desired density and strength to effectively meet the conditions of its use.

It will be understood that my present invention is not restricted to the employment of any particular elements in the compound from which is produced the artificial lumber or building material, but that the improved method is adaptable to the forming of the slabs or articles from various compounds which consist of a suitable filler mixed with a relatively small proportion of a soluble fireproof binder and adapted to be solidified and hardened and dried to impart the desired density and strength for resisting the strains and conditions of use in building construction.

The specific form of the molded article may be varied to suit the circumstances and conditions of use, and I have herein shown the same in the form of a slab or board adapted for use in flooring, ceiling, or wainscoting construction or in other parts or features of general building constructions.

In carrying out the method of forming the articles of artificial lumber, after the compound has been molded into the desired form or shape, such as a slab or board, it is compressed and solidified and hardened and dried by placing it in association with heated plates in a suitable press, and the arrangement in the press is preferably in tiers so that a plurality of the slabs or boards are acted upon in one movement.

Referring to the drawings, 1 designates a type of press which may be employed in carrying out my improved method.

2—2 designate a plurality of steam chambers, which have a plate surface, as at 3, to conform to the surface of the molded slab or board, steam being introduced to said chambers by means of communicating tubes or pipes, 4. The press has a suitable bed or base, 5, and a follower, 6, controlled by a screw, 7, operating in a cross-head, 8, to exert the desired degree of pressure upon the molded slabs or boards which are arranged in tiers.

In carrying out the method of forming the slabs or boards, the first steam chamber 2 is mounted above the bed or base 5 of the press, then a smooth metal plate or sheet, 9, is placed upon the plate surface 3 of the steam chamber 2, and another metal plate or sheet, 10, is placed upon said first plate 9.

The plate 9 is of suitable thickness, and is preferably formed of bronze, and the plate 10 is relatively thin and is preferably formed of bronze or copper. I have found in practice that Tobin bronze is especially adaptable for the thin plate 10, as it possesses a minimum degree of adhesive property with relation to the plastic slab or board which constitutes the artificial lumber. The interposition of a plurality of separating plates between the slab or board and the steam chamber is an important and advantageous feature, inasmuch as the employment of a single plate or a thick plate in contact with the artificial lumber would result in the adhesion of the plate to the slab or board after the latter is compressed, whereas the employment of the plurality of relatively thick and thin plates affords the desired thickness of intervening metal between the artificial lumber and the steam chamber during compression and enables the ready separation of the thin plate from contact with the artificial lumber after the latter is removed from the press. The plate of relatively extreme thinness is the only one of the plurality of plates, as above set forth, which is in direct contact with the artificial lumber, and any adhesion of this thin plate to the slab or board of artificial lumber when the latter is removed from the press is readily overcome by the pliability of the plate which enables the ready and convenient stripping of the plate from its contact with the artificial lumber.

The molded article, represented by the slab or board of artificial lumber, as at 11, is placed upon the thin metal plate or sheet 10, and then a perforated metal plate or sheet, 12, is placed upon the molded slab or board 11, and another perforated metal plate or sheet, 14, is placed upon the perforated plate 12.

The perforated plate 12, which is in contact with the artificial lumber, is provided with relatively fine or small perforations, as shown at 15 in Fig. 2, while the perforated plate 14, which is placed upon the plate 12, is provided with relatively coarse or large perforations, as at 16 in Fig. 3. The purpose of these perforated plates is to permit the moisture or steam to effectually escape from the artificial lumber during the compression thereof to harden and dry the same. The interposition of a plurality of perforated plates, as just described, is an important and advantageous feature, inasmuch as it is desirable to leave a smooth and approximately even surface upon the slab or board of artificial lumber, while it is also necessary to employ large perforations to enable the escape of the moisture or steam, and the employment of the finely perforated plate 15 in direct contact with the slab or board avoids impairment of the smooth surface of the latter, while the coarse or large perforations of the plate 14 permit the effective escape of the steam or moisture passed thereto from the underlying finely perforated plate 15.

Upon the uppermost perforated plate 14 is laid a sheet of wire netting, 17, to permit the moisture or steam, escaping at the top of the plate 14, to pass off laterally from the elements arranged in tier in the press. Upon the wire netting is placed another metal plate or sheet, 18, which is preferably formed of zinc, which operates to separate the underlying elements from the next steam chamber 2 which is mounted immediately above said plate 18 and has the smooth plate surface 3 at both its top and bottom. Then, above said second steam chamber 2 is placed the relative series of intervening plates and wire netting and the molded slab or board, in the same manner as between the first and second steam chambers 2 as above described. In this manner, the molded articles, represented by the slabs or boards of artificial lumber 11, with the intervening plurality of perforated plates and plurality of imperforate plates and the wire nettings, are successively disposed in tier arrangement within the press, and then by operating the follower 6 the entire tier is subjected to the required pressure and heat to effectually compress and harden and dry the slabs or boards 11.

In carrying out my improved method, under the steps and conditions herein described, in the final step of subjecting the molded articles to pressure and heat the pressure is preferably exerted in successive steps each of increased intensity and each maintained for a predetermined period. For instance, first a pressure will be exerted at an initial degree of intensity (say, from fifteen to twenty tons), and this degree of pressure will be maintained for a certain period. Then, a second pressure will be exerted at an increased degree of intensity and likewise maintained for a determined period, and then a further period of pressure will be exerted at a further increased degree of intensity and maintained for a determined period, and so on until, by successive periods of pressure each successively of increased intensity, the molded article is dried and compressed and hardened to the desired degree of density. The successive conditions in the pressure step, as just set forth, are an important feature of the improvements involved in the method constituting my present invention, as the subjecting of the molded article to successive pressure steps increasing successively in the degree of intensity, and each maintained for a determined period, enables a more effective action upon the moist and molded plastic substance of the article to properly dry the same and to compress and harden it to the desired degree of density, as will be readily understood, by reason of the fact that the molded article is subjected to successive periods of successively increasing pressure.

It will also be understood that the press as employed in my improved process, under conditions calling for the higher degrees of pressure, may be of any well known hydraulic or steam power type whereby high pressures may be effectively established and maintained for determined periods.

The advantages of my improved method of forming artificial lumber, as herein described, will be readily understood by those skilled in the art to which it appertains. The improvements enable the effectual drying and hardening of the molded articles by compression, in a manner which effects economy and facility in operation, and' increased efficiency in results, without impairment of the desired surface conditions of the artificial lumber thus produced by this improved process.

Having thus described my invention, I claim and desire to secure by Letters Patent:

1. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a plurality of metal plates or sheets intervening between said molded article and the heated chamber or plate, the plate or sheet immediately next to the molded article being relatively thin or pliable, and finally subjecting said elements within the press to the requisite pressure and heat to dry and compress and harden the molded articles to the desired degree of density.

2. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a thin or pliable metal plate or sheet intervening between said molded article and the heated chamber or plate and in direct contact with the molded article, whereby said thin or pliable plate is adapted to be readily stripped from the molded article after the latter is compressed, and finally subjecting said elements within the press to the requisite pressure and heat to dry and compress and harden the molded articles to the desired degree of density.

3. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a plurality of perforated metal plates or sheets superposed and placed against the surface of the molded article, said perforated plates respectively having perforations of different sizes, and then subjecting said elements within the press to the requisite pressure and heat to dry and compress and harden the molded articles to the desired degree of density.

4. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a thin or pliable metal plate or sheet intervening between said molded article and the heated chamber or plate and in direct contact with the molded article, whereby said thin or pliable plate is adapted to be readily stripped from the molded article after the latter is compressed, and with a plurality of perforated metal plates or sheets superposed and placed against the surface of the molded article, said perforated plates respectively having perforations of different sizes, and then subjecting said elements within the press to the requisite pressure and heat to dry and compress and harden the molded articles to the desired degree of density.

5. The method of forming artificial lumber, which consists in combining a suitable filler with a relatively small proportion of a soluble fireproof binder to produce a plastic substance, then molding the moist plastic substance into the desired shape, then placing the molded articles in a tier in a suitable press in association with intervening heated chambers or plates with a plurality of metal plates or sheets intervening between said molded article and the heated chamber or plate and with a plurality of perforated metal plates or sheets superposed and placed against the surface of the molded article, and then subjecting the tier to the requisite pressure and heat to dry and compress and harden the molded articles to the desired degree of density.

6. The method of forming artificial lumber, which consists in combining a suitable filler including asbestos with a relatively small proportion of a soluble fireproof binder including silicate of soda and with a fluid to produce a plastic substance, then molding the plastic substance into the desired shape, then placing the molded articles in a tier in a suitable press in association with intervening heated chambers or plates with a plurality of metal plates or sheets intervening between said molded article and the heated chamber or plate and with a plurality of perforated metal plates or sheets superposed and placed against the surface of the molded article, and then subjecting the tier to the requisite pressure and heat to dry and compress and harden the molded articles to the desired degree of density.

7. The method of forming artificial lumber, which consists in combining a suitable filler with a relatively small proportion of a soluble fireproof binder to produce a plastic substance, then molding the moist plastic substance into the desired shape, then placing the molded articles in a suitable press in association with heated chambers or plates with a thin or pliable metal plate or sheet intervening between said molded article and the heated chamber or plate and in direct contact with the molded article, whereby said thin or pliable plate is adapted to be readily stripped from the molded article after the latter is compressed, and with a plurality of perforated metal plates or sheets superposed and placed against the surface of the molded article, and with a sheet of wire netting against said plurality of perforated plates, and then subjecting said elements within the press to the requisite pressure and heat to dry and compress and harden the molded articles to the desired degree of density.

8. The method of forming artificial lumber, which consists in combining a suitable filler with a relatively small proportion of a soluble fireproof binder to produce a plastic substance, then molding the moist plastic substance into the desired shape, and then placing the molded article in a suitable press in association with heated chambers or plates and subjecting the article to successive periods of pressure successively increasing in intensity, to dry and compress and harden the molded article to the desired degree of density.

9. The method of forming artificial lumber, which consists in combining a suitable filler with a relatively small proportion of a soluble fireproof binder to produce a plastic substance, then molding the plastic substance into the desired shape, and then placing the molded article in a suitable press in association with heated chambers or plates and subjecting the article to successive periods of pressure each maintained for a predetermined period and each successively of increased intensity, to dry and compress and harden the molded article to the desired degree of density.

10. The method of forming artificial lumber, which consists in combining a suitable filler with a relatively small proportion of a soluble fireproof binder to produce a plastic substance, then molding the plastic substance into the desired shape, and then placing the molded article in a suitable press in association with heated chambers or plates and subjecting the article to successive periods of pressure each of which is successively maintained for a predetermined period, to dry and compress and harden the molded article to the desired degree of density.

In testimony whereof I have signed my name in the presence of the subscribing witnesses.

JAMES A. WHEELER.

Witnesses:
CHARLES A. TAUSSIG,
BESSIE COSTIGAN.